(12) United States Patent
Hsu et al.

(10) Patent No.: US 11,885,959 B1
(45) Date of Patent: Jan. 30, 2024

(54) OPTICAL SYSTEM WITH GHOST IMAGE MITIGATION

(71) Applicant: Apple Inc., Cupertino, CA (US)

(72) Inventors: Wei-Liang Hsu, Cupertino, CA (US); Sheng Zhang, Milpitas, CA (US); Mark F. Flynn, San Jose, CA (US); Yury A. Petrov, Half Moon Bay, CA (US); Chaohao Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 16/550,108

(22) Filed: Aug. 23, 2019

Related U.S. Application Data

(60) Provisional application No. 62/726,035, filed on Aug. 31, 2018.

(51) Int. Cl.
| | | |
|---|---|---|
| *G02B 27/28* | (2006.01) | |
| *G02B 27/00* | (2006.01) | |
| *G02B 5/00* | (2006.01) | |
| *G02B 13/00* | (2006.01) | |
| *G02B 1/115* | (2015.01) | |

(52) U.S. Cl.
CPC .......... *G02B 27/0018* (2013.01); *G02B 1/115* (2013.01); *G02B 5/003* (2013.01); *G02B 13/002* (2013.01)

(58) Field of Classification Search
CPC ........ G02B 17/08; G02B 27/00; G02B 27/01; G02B 27/28; G02B 17/0856; G02B 27/0018; G02B 27/0172; G02B 27/283; G02B 27/286; G02B 2027/0138; G02B 13/002; G02B 1/115; G02B 5/003; G09G 3/00; G09G 3/003
See application file for complete search history.

(56) References Cited

U.S. PATENT DOCUMENTS 5,715,023 A * 2/1998 Hoppe ................. G02B 5/3016
349/11
5,966,242 A 10/1999 Yamanaka
(Continued)

FOREIGN PATENT DOCUMENTS

| CN | 108347597 A | 7/2018 |
|---|---|---|
| CN | 208314341 U | 1/2019 |
| WO | 2019082039 A1 | 5/2019 |

*Primary Examiner* — Balram T Parbadia
(74) *Attorney, Agent, or Firm* — Treyz Law Group, P.C.; Michael H. Lyons

(57) ABSTRACT

An electronic device may include a display system with a pixel array and a catadioptric lens. The display system may include a linear polarizer through which image light from the pixel array passes and a first quarter wave plate through which the light passes after passing through the polarizer. The lens may include a partial mirror, a second quarter wave plate, and a reflective polarizer. A third quarter wave plate may be formed between the linear polarizer and the pixel array to mitigate ghost images. Control circuitry may predict potential ghost images based on the geometry of the lens and data from an image frame. Tone mapping circuitry may adjust contrast of the image frame within a region overlapping the predicted ghost image. The control circuitry may adjust luminance of the image frame outside of the region overlapping the predicted ghost image.

21 Claims, 6 Drawing Sheets

(56) References Cited

U.S. PATENT DOCUMENTS

| | | | |
|---|---|---|---|
| 6,075,651 A * | 6/2000 | Hoppe | G02B 27/0172 |
| | | | 359/15 |
| 6,853,491 B1 * | 2/2005 | Ruhle | G02B 5/3016 |
| | | | 359/630 |
| 9,507,066 B2 | 11/2016 | Kollin et al. | |
| 9,555,589 B1 * | 1/2017 | Ambur | G02B 13/0055 |
| 10,095,036 B2 | 10/2018 | Carollo et al. | |
| 10,133,074 B2 | 11/2018 | Carollo et al. | |
| 10,203,489 B2 | 2/2019 | Khan et al. | |
| 10,495,798 B1 * | 12/2019 | Peng | G02B 27/0081 |
| 10,578,873 B2 * | 3/2020 | Lee | G02B 27/286 |
| 2010/0040280 A1 * | 2/2010 | McKnight | G09G 3/003 |
| | | | 382/154 |
| 2010/0177113 A1 * | 7/2010 | Gay | G02B 30/27 |
| | | | 345/589 |
| 2012/0038978 A1 * | 2/2012 | Tanabe | G02B 21/245 |
| | | | 359/372 |
| 2017/0227777 A1 * | 8/2017 | Carollo | G02B 27/0176 |
| 2017/0255015 A1 * | 9/2017 | Geng | G02B 6/08 |
| 2018/0048875 A1 * | 2/2018 | Park | H04N 13/189 |
| 2018/0101020 A1 * | 4/2018 | Gollier | G02B 27/0172 |
| 2019/0079234 A1 * | 3/2019 | Takagi | G02B 5/3058 |
| 2019/0171005 A1 | 6/2019 | Lee et al. | |
| 2019/0313087 A1 * | 10/2019 | Geng | H04N 13/344 |
| 2020/0096780 A1 * | 3/2020 | Ouderkirk | G02B 17/0856 |

\* cited by examiner

OPTICAL SYSTEM WITH GHOST IMAGE MITIGATION

This application claims the benefit of provisional patent application No. 62/726,035, filed Aug. 31, 2018, which is hereby incorporated by reference herein in its entirety.

BACKGROUND

This relates generally to optical systems and, more particularly, to optical systems for devices with displays.

Lenses may sometimes be used to allow a viewer to view a nearby display. For example, electronic devices such as virtual reality glasses use lenses to display images for a user.

If care is not taken, lenses and other optical components in these electronic devices may be bulky and heavy and may not exhibit satisfactory optical performance.

SUMMARY

An electronic device such as a head-mounted device or other electronic device may include a display system and an optical system. The display system and optical system may be supported by support structures that are configured to be worn on the head of a user. The electronic device may use the display system and optical system to present images to the user while the device is being worn by the user.

The display system may have a pixel array that produces image light associated with the images. The pixel array may have a curved or planar surface. The display system may also have a linear polarizer through which image light from the pixel array passes and a first quarter wave plate through which the light passes after passing through the linear polarizer. The light may then pass through a catadioptric lens having a partial mirror, a second quarter wave plate, and a reflective polarizer. A third quarter wave plate may be formed between the linear polarizer and the pixel array to mitigate ghost images associated with the partial mirror in the catadioptric lens.

The optical system may be coupled to control circuitry that receives an image frame. The control circuitry may identify (predict) potential ghost images associated with the catadioptric lens based on the geometry of the lens and image data in the image frame. The control circuitry may generate a grid having a region overlapping the predicted ghost image. A look-up table may select a tone mapping curve from a set of tone mapping curves based on the grid and the image frame. Tone mapping circuitry may adjust contrast of the image frame using the selected tone mapping curve to produce an adjusted image frame that is displayed by the display. If desired, luminance adjustment circuitry may adjust luminance of the image frame outside of the region overlapping the predicted ghost image.

DETAILED DESCRIPTION

Electronic devices such as head-mounted display devices may be used for virtual reality and augmented reality systems (sometimes referred to as mixed reality systems). For example, a pair of virtual reality glasses that is worn on the head of a user may be used to provide a user with virtual reality content.

Figure 1:
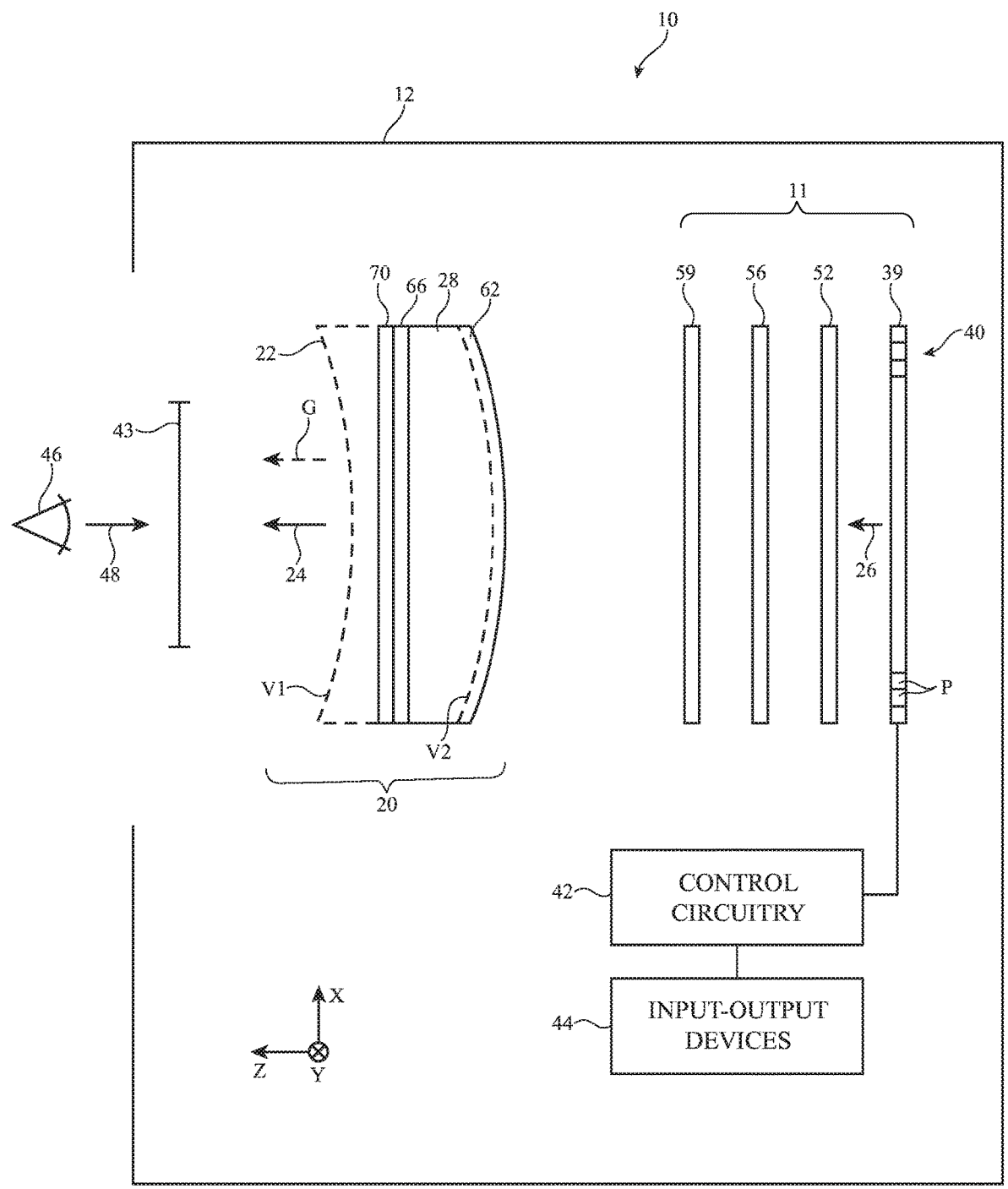
FIG. 1 is a diagram of an illustrative head-mounted display showing components of an illustrative optical system in the head-mounted display in accordance with an embodiment.

An illustrative system that includes an electronic device such as a head-mounted device is shown in FIG. 1. As shown in FIG. 1, electronic device 10 (e.g., a head-mounted device with support structures configured to be worn on the head of a user such as glasses, goggles, a helmet, hat, etc.) may include a display system with one or more displays 40 (e.g., a display for each of a user's eyes such as eye 46). A single display 40 is shown in FIG. 1. Systems with a pair of displays 40 may present images to a user's left and right eyes simultaneously.

Device 10 may include an optical system 20 and a display system 11 supported by head-mounted support structures such as housing 12. Housing 12 may have the shape of a frame for a pair of glasses, may have the shape of a helmet, may have the shape of a pair of goggles, or may have any other suitable housing shape that allows housing 12 to be worn on the head of a user. Configurations in which housing 12 supports optical system 20 and display system 11 in front of a user's eyes (e.g., eye 46) as the user is viewing system 20 and display system 11 in direction 48 may sometimes be described herein as an example. If desired, housing 12 may have other suitable configurations.

Display system 11 may include a display 40. Display 40 has an array of pixels P (pixel array 39) that present images to a user (see, e.g., user eye 46, which is viewing display 40 in direction 48 through optical system 20 which may be formed using a catadioptric lens). Pixel array 39 of display 40 may be based on a liquid crystal display, an organic light-emitting diode display, an emissive display having an array of crystalline semiconductor light-emitting diode dies, and/or displays based on other display technologies. In a preferred embodiment, the display is a self-emitting display, which can be more compact since illumination optics are not required. Separate left and right displays may be included in device 10 for the user's left and right eyes. Each display such as display 40 of FIG. 1 may be planar or may have a curved shape.

Visual content (e.g., image data for still and/or moving images) may be provided to display 40 using control circuitry 42 that is mounted in device 10 and/or control circuitry that is mounted outside of device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display 40 to display visual content such as virtual reality content (e.g., computer-generated content associated with a virtual world), pre-recorded video for a movie or other media, or other images. Illustrative configurations in which control circuitry 42 provides a user with virtual reality content using displays such as display 40 may sometimes be described herein as an example. In general, however, any suitable content may be presented to a user by control circuitry 42 using display 40.

Input-output devices 44 may be coupled to control circuitry 42. Input-output devices 44 may be used to gather user input from a user, may be used to make measurements on the environment surrounding device 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensors, accelerometers, gyroscopes, and/or other sensors for measuring orientation, position, and/or movement of device 10, proximity sensors, capacitive touch sensors, strain gauges, gas sensors, pressure sensors, ambient light sensors, and/or other sensors). If desired, input-output devices 44 may include one or more cameras (e.g., cameras for capturing images of the user's surroundings, cameras for performing gaze detection operations by viewing eyes 46, and/or other cameras).

A polarizer such as linear polarizer 56 may be placed in front of pixel array 39 and/or may be laminated to pixel array 39 to provide polarized image light. Linear polarizer 56 may have a pass axis aligned with the X-axis of FIG. 1 (as an example). Display system 11 may also include a wave plate such as quarter wave plate 59 to provide circularly polarized image light. The fast axis of quarter wave plate 59 may be aligned at 45 degrees to the pass axis of linear polarizer 56. Quarter wave plate 59 may be mounted in front of polarizer 56 (between polarizer 56 and optical system 20). If desired, quarter wave plate 59 may be attached to polarizer 56 (and display 40). Display 40 may emit image light 26 that is circularly polarized after passing through quarter wave plate 59.

Optical system 20 may include lens elements such as lens elements 28 and 22. Lens element 28 may be a plano-convex lens (lens element) with a convex surface V2 facing display system 11. Optional lens element 22 may be a plano-concave lens (lens element) with a concave surface V1 facing the user (eye 46). This example is merely illustrative. Surfaces V2 and V1 may be convex, concave, planar, spherical, aspherical, freeform, or have other curved shapes.

Optical structures such as partially reflective coatings, wave plates, reflective polarizers, linear polarizers, antireflection coatings, and/or other optical components may be incorporated into device 10 (e.g., system 20, etc.). These optical structures may allow light rays from display system 11 to pass through and/or reflect from surfaces in optical system 20 thereby providing optical system 20 with a desired lens power (e.g., for image light 24 that passes to eye box 43 and eye 46). For example, optical system 20 may include a reflective polarizer 70, a quarter wave plate 66, and a partially reflective mirror 62. Optical system 20 may form a catadioptric lens for display system 11 and may sometimes be referred to herein as catadioptric lens 20 or lens 20.

If care is not taken, reflections within lens 20 may produce ghost images G that are visible to eye 46. Display system 11 may include ghost image mitigation structures that serve to eliminate or minimize ghost images such as ghost image G. For example, display system 11 may include quarter wave plate 52 between polarizer 56 and display 40 that serves to mitigate or eliminate ghost image G. The operation of quarter wave plate 52 in mitigating ghost image G is described in greater detail below in connection with FIG. 2. The example of FIG. 1 in which lens 20 includes lens elements 22 and 28 is merely illustrative. If desired, one or more additional lens elements may be incorporated into lens 20. For example, an additional lens element may be interposed between reflective polarizer 70 and quarter wave plate 66. If desired, an additional lens element may be formed over partially reflective mirror 62. Lens 20 may include any desired number of one or more lens elements. Each lens element may include concave, convex, planar, spherical, aspherical, freeform, and/or other curved surfaces that may be used for additional focusing, distortion correction, etc. Each lens element may be attached together, or one or more of the lens elements may be separated from the other lens elements in lens 20 by an air gap or other structures.

Figure 2:
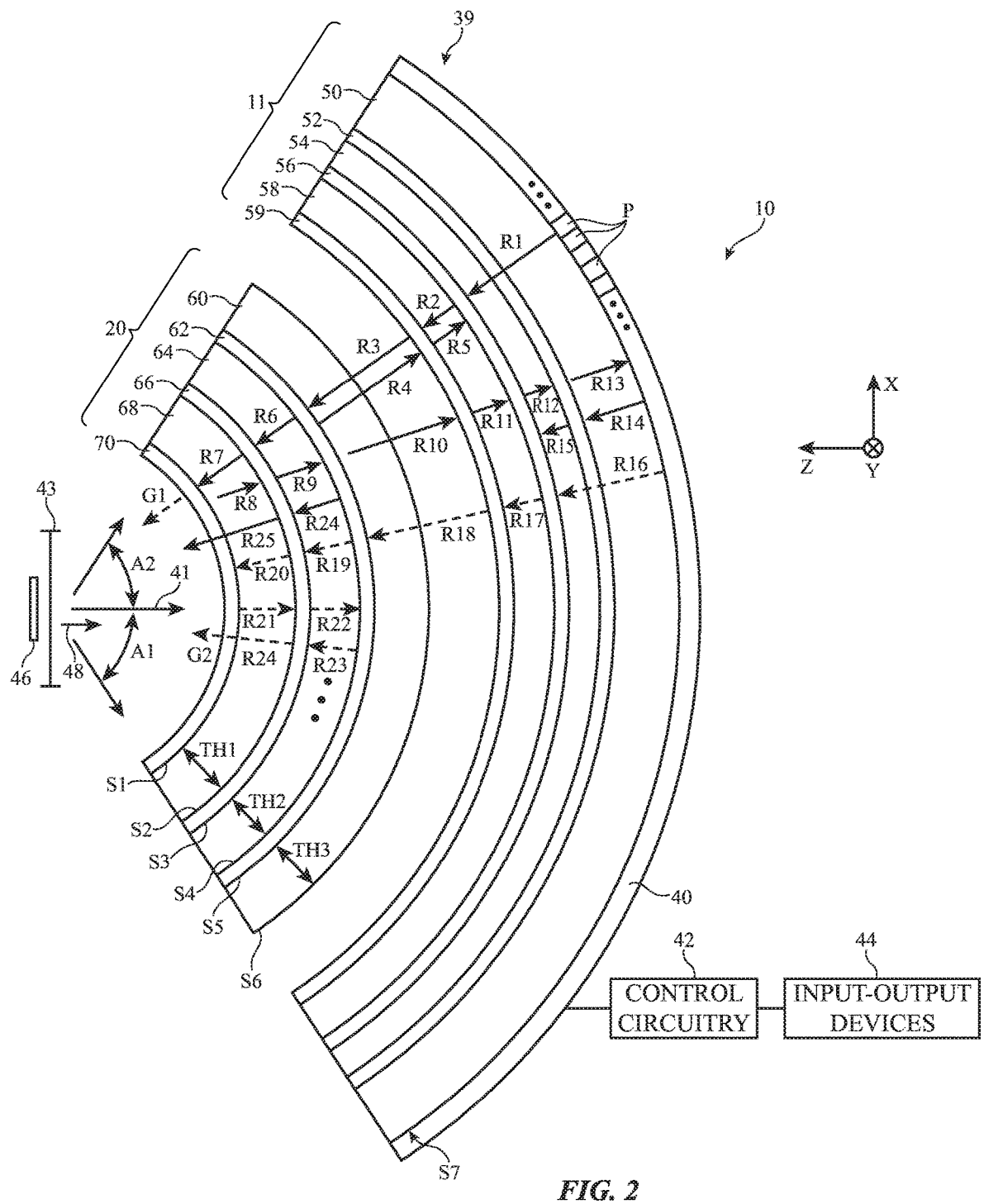
FIG. 2 is a diagram of an illustrative head-mounted device in one example where a curved pixel array is incorporated into the head-mounted device in accordance with an embodiment.

The example of FIG. 1 in which display 40 has a planar shape is merely illustrative. If desired, display 40 may have other shapes such as a spherical shape, aspherical shape, freeform shape, curved shape, etc. FIG. 2 is a diagram illustrating how quarter wave plate 52 may mitigate ghost images such as ghost image G in an example where display 40 has a curved shape. This is merely illustrative and, in general, similar ghost mitigation operations may be performed for displays 40 having any desired shape and for lenses 20 having any number of lens elements with any desired shapes.

As shown in FIG. 2, display 40 and pixel array 39 may have a surface S7 facing eye 46. Surface S7 may be spherically, aspherically, or freeform curved, e.g., surface S7 of display 40 may be concave. With one illustrative configuration, concave surface S7 of pixel array 39 and display 40 may be a spherical surface and may be radially symmetric about axis 41. Aspherical or freeform surface shapes may also be used for surface S7.

Catadioptric lens 20 may be configured to focus image light from pixel array 39 into eye box 43 (e.g., a circle of about 10-20 mm in diameter). Eye 46 may be located about 10-30 mm from the innermost surface of lens 20. The field of view of lens 20 may be characterized by angles A1 and A2 with respect to axis 41. Angle A1 may be at least 70° or at least 80° and angle A2 may be at least 30° or at least 40° (e.g., when eye 46 is a right eye and when lens 20 is being viewed from above). Nasal (nose-facing) angle A2 is preferably less than about 50°, because the user's nose prevents a wider nasal field of view. The temporal (temple-facing) angle of view A1 may be larger (e.g., at least 80°) to expand a user's peripheral vision. Overall, the field of view of each lens 20 (e.g., the field of view per eye) may be at least 120°, at least 125°, less than 160°, or other suitable value and the resulting binocular field of view (the field of view for both of a user's eyes taken together) may be at least 150°, at least 160° or other suitable value.

Catadioptric lens 20 may include lens elements such as lens elements 60, 64, and 68.

Lens elements 60, 64, and 68 may be formed from glass, polymer, or other materials. One or more of lens elements 60, 64, and 68 may be omitted if desired. Additional lens elements may be mounted to lens elements 60, 64, and/or 68 if desired. Lens elements 60, 64, and 68 may be characterized by curved surfaces S1, S2, S3, S4, S6, and S6. Curved surfaces S1 and S2 of lens element 68, curved surfaces S3 and S4 of lens element 64, curved surfaces S5 and S6 of lens element 60, and curved surface S7 of display 40 may be spherical. If desired, one or more of these surfaces may be aspherical, planar, or freeform.

In the example of FIG. 2, surfaces S6, S4, and S2 are convex surfaces and face concave surface S7 of pixel array 39. Lens element 68 may have opposing convex and concave surfaces. Surface S2 may form the convex surface of lens element 68 and surface S1 may form the opposing concave surface of lens element 68. Lens element 64 may also have opposing convex and concave surfaces. Surface S3 may form the concave surface of lens element 64 and surface S4 may form the convex surface of lens element 64. Lens element 60 may also have opposing convex and concave surfaces. Surface S5 may form the concave surface of lens element 60 and surface S6 may form the convex surface of lens element 60. Concave surface S5 may have a curvature that matches that of convex surface S4 and concave surface S3 may have a curvature that matches that of convex surface S2, so concave surface S5 may sometimes be referred to as surface S4 or surfaces S5 and S4 may collectively be referred to as the curved surface between elements 64 and 60. Similarly, concave surface S3 may sometimes be referred to as surface S2 or surfaces S3 and S2 may collectively be referred to as the curved surface between elements 64 and 68.

Optical structures such as partially reflective coatings, wave plates, reflective polarizers, linear polarizers, antireflection coatings, and/or other optical components may be incorporated into device 10. These optical structures may allow light rays from display 40 to be emitted from surface S7 of display 40 and to pass through and/or reflect from surfaces in lens 20 such as surfaces S1-S6. The radius of curvature of surfaces S1-S6 may be about 10-70 mm, at least 20 mm, less than 60 mm, 15-35 mm, 20-30 mm, 20-40 mm, or other suitable size. As shown in FIG. 2, lens elements 60, 64, and 68 may be concentric dome lenses that together form a cemented triplet with films and coatings on the various surfaces to control the path of the image light as it passes through the catadioptric lens 20.

Lens elements 60, 64, and 68 may have respective thicknesses TH3, TH2, and TH1. Thickness TH1 may be uniform throughout element 68 (e.g., TH1 may vary by less than 5%, less than 10%, or less than another suitable amount throughout element 26). Thickness TH2 may be uniform throughout element 64 (e.g., TH2 may vary by less than 5%, less than 10%, or less than another suitable amount throughout element 26). Thickness TH3 may be uniform throughout element 60 (e.g., TH3 may vary by less than 5%, less than 10%, or less than another suitable amount throughout element 26). Additional lens elements may be mounted to surfaces S1 and/or S6 if desired. Lens element 60 may be omitted in one suitable arrangement.

Chromatic aberrations may be minimized by forming most of the lens power of lens 20 from the reflective structures of lens 20 and by forming only a small amount (e.g., negligible amount) of the lens power of lens 20 through refraction by lens elements 60, 64, and 68. As an example, lens 20 may be characterized by a refractive effective focal length of −170 mm and a total effective focal length of +35 mm. With this type of configuration the overall focal length of lens 20 has a positive sign rather than a negative sign when the reflective contribution and the refractive contribution are combined because the reflective structures of lens 20 dominate the overall performance of the lens. This helps reduce chromatic aberrations which are associated with refractive lens power. In general, lens 20 may have any suitable focal length (e.g., 30-40 mm, at least 15 mm, at least 25 mm, less than 45 mm, less than 55 mm, etc.). The reflective contribution to the lens power of lens 20 may be greater than the refractive contribution to the lens power (e.g., the reflective contribution may be at least three times, at least five times, at least ten times, or more than the refractive contribution).

Linear polarizer 56, a retarder such as a quarter wave plate 59, and a retarder such as quarter wave plate 52 may be located between pixel array 39 and lens 20 (e.g., within display system 11). Linear polarizer 56 may be interposed between quarter wave plates 59 and 52. Linear polarizer 56 and quarter wave plate 59 may be used to circularly polarize light emitted by display 40. Linear polarizer 56 may have a pass axis aligned with the X-axis of FIG. 2 (as an example) and the fast axis of quarter wave plate 59 is aligned at 45 degrees to the pass axis of the linear polarizer. The fast axis of quarter wave plate 52 is also aligned at 45 degrees to the pass axis of linear polarizer 56 (e.g., parallel or orthogonal to the fast axis of quarter wave plate 59). Quarter wave plate 52 may serve to mitigate ghost images in device 10.

With the illustrative arrangement of FIG. 2, quarter wave plate 52 is formed on surface S7 of pixel array 39. Quarter wave plate 52 may be a film or coating that is attached to surface S7 with a layer of adhesive such as optically clear adhesive 50. Linear polarizer 56 may be formed from a polarizer film that is thermoformed into a shape to match concave surface S7 and attached to quarter wave plate 52 using a layer of adhesive such as optically clear adhesive 54. Quarter wave plate 59 may be a film or coating that is attached to linear polarizer 56 with a layer of adhesive such as optically clear adhesive 58.

Adhesive layers 58, 54, and/or 50 may be replaced using any desired substrates or may be omitted if desired. Layers 58, 54, and 50 may have any desired thicknesses and are illustrated in FIG. 2 with a relatively large thickness for the sake of clarity. If desired, quarter wave plate 59, linear polarizer 56, and/or quarter wave plate 52 may be formed on convex surface S6 of lens element 60, on layer 62 of lens 20, or may be located at other suitable locations between surfaces S4 and S7. Optional antireflection coating may be formed on any surfaces that are exposed to air (e.g., the surface of quarter wave plate 59 and/or lens element 60) to enhance light transmission.

Surface S7 may have significant curvature, so the use of a coating process may help ensure satisfactory formation of quarter wave plates 59 and 52. With one illustrative configuration, quarter wave plates 59 and 52 may be liquid-crystal-based retarder layers (e.g., birefringent coatings formed from liquid crystals in a liquid polymer binder that is applied to surface S7 by spin coating or other suitable deposition techniques followed by ultraviolet light curing and/or thermal curing). In either embodiment, associating quarter wave plate 59 with a linear polarizer such as linear polarizer 56 will cause the image light entering lens 20 to be circularly polarized, provided that the fast axis of the quarter wave plate is oriented at 45 degrees to the pass axis of the linear polarizer 56.

For example, as shown in FIG. 2, pixels P in display 40 may emit light (e.g., image light), as shown by ray R1. Light R1 may be un-polarized and may pass through quarter wave plate 52. Linear polarizer 56 linearly polarizes the emitted light (e.g., based on the pass axis of linear polarizer 56), as shown by linearly polarized ray R2. Quarter wave plate 59 may circularly polarize the linearly polarized light R2, as shown by circularly polarized ray R3. In the example of FIG.

2, light R3 is circular-polarized in a first direction (e.g., light R3 may be right-hand circular polarized).

A partially reflective mirror coating may form partially reflective mirror 62 of lens 20. As shown in FIG. 2, partially reflective mirror 62 may be formed on convex surface S4 of lens element 64. The coating for mirror 62 is a metal mirror coating or other mirror coating layer such as a dielectric multilayer coating with a 50% transmission coefficient and a 50% reflection coefficient or other suitable light transmission and reflection values. When circularly polarized image light (e.g., ray R3) strikes partially reflective mirror 62, a portion of ray R3 will pass through partially reflective mirror 62 to become reduced-intensity ray R6. Simultaneously, a portion of ray R3 will be reflected by the partially reflective mirror 62, as shown by ray R4. Reflected portion R4 of ray R3 will be circularly polarized in a second direction (e.g., left-hand circular polarized). Circularly polarized light R4 may pass back through the quarter wave plate 59 such that the circularly polarized light is converted to linearly polarized light R5 with the opposite polarization state so that it will be absorbed by the linear polarizer 62, thereby trapping the reflected light and reducing stray light in the optics of the electronic device 10.

Ray R6 is circularly polarized (e.g., right-hand circular polarized). A third quarter wave plate such as quarter wave plate 66 may be included in optical system 20 between the partially reflective mirror 26 and a reflective polarizer 70. Quarter wave plate 66 may convert the circular polarization state of ray R6 into a linear polarization state, as shown by linearly polarized ray R7 (e.g., the fast axis of quarter wave plate 66 may be aligned at 90 degrees with respect to the fast axis of quarter wave plate 59). Quarter wave plate 66 may be formed under the partially reflective mirror 62 on surface S4 (not shown), on convex surface S2 of lens element 68 (as shown in FIG. 2), on concave surface S3 of lens element 64, and/or may be formed on the concave surface S1 of lens element 68 (not shown) with reflective polarizer 70 under the quarter wave plate.

Reflective polarizer 70 may be formed on concave surface S1 of lens element 68. Alternatively, a thin (about 1 mm) curved spherical dome lens (not shown) may be provided with an optically clear adhesive that adhesively bonds the reflective polarizer to it. The dome lens with reflective polarizer 70 can then be adhesively bonded to surface S1. In the illustrative configuration of FIG. 2, quarter wave plate 66 has been formed from a coating layer (e.g., a birefringent liquid-crystal-based polymer layer) on surface S2. Optically clear adhesive layers (not shown) may be used to attach lens elements 68, 64, and 60 together.

Quarter wave plate 66 may convert circularly polarized ray R6 into a linearly polarized ray R7 having a polarization aligned with the X-axis of FIG. 2. Reflective polarizer 70 may be a polymer film (e.g., a multilayer reflective polarizer film or a wire-grid polarizer film) that is thermoformed onto concave surface S1 of lens element 68. However, surface S1 may have significant curvature making thermoforming undesirable due to the large distortion imparted to the reflective polarizer film, as a result, it may be desirable to form reflective polarizer 70 from a coating layer. With one illustrative configuration, reflective polarizer 70 may be a wire-grid polarizer formed using a sol-gel process. During formation of reflective polarizer 70, a glass-based sol-gel liquid is applied to surface S1 and is patterned using a stamper with a nanoscale polarizer pattern, where the solgel can included electrically conductive components or electrically conductive materials can be preferentially applied to the solgel pattern to form an array of nanoscale wire conductors that together form the wire-grid polarizer. Other reflective polarizer coating techniques may be used, if desired.

Reflective polarizer 70 may have orthogonal reflection and pass axes. Light that is polarized parallel to the reflection axis of reflective polarizer 70 will be reflected by reflective polarizer 70. Light that is polarized perpendicular to the reflection axis and therefore parallel to the pass axis of reflective polarizer 70 will pass through reflective polarizer 70. In the illustrative arrangement of FIG. 2, reflective polarizer 70 has a reflection axis that is aligned with the X-axis, so ray R7 will reflect from reflective polarizer 70 at surface S1 as reflected ray R8.

Reflected ray R8 has a linear polarization aligned with the X-axis. After passing through quarter wave plate 66, the linear polarization of ray R8 will be converted into circular polarization (i.e., ray R8 will become circularly polarized ray R9). Circularly polarized light R9 may be circularly polarized in the first direction (e.g., light R9 may be right-hand circular polarized).

Circularly polarized ray R9 will travel through lens element 64 and a portion of ray R9 will be reflected in the Z direction by the partially reflective mirror 62 on the convex surface S4 of lens element 64 (as reflected ray R24). The reflection from the curved shape of surface S4 provides optical system 20 with additional optical power. Ray R24 is circularly polarized in a second direction (e.g., ray R24 is left-hand circular polarized). After passing back through lens element 64 and quarter wave plate 66, ray R24 will become linearly polarized, as shown by ray R25. The linear polarization of ray R25 is aligned with the Y-axis of FIG. 2, which is parallel to the pass axis of reflective polarizer 70. Accordingly, ray R25 will pass through reflective polarizer 70 to provide a viewable image to the user.

If desired, device 10 may include an additional linear polarizer such as a clean-up linear polarizer (not shown) positioned between the reflective polarizer 70 and the user's eye 46, where the clean-up linear polarizer has a pass axis aligned with the pass axis of reflective polarizer 70 (i.e., parallel to the Y-axis in this example) and will therefore remove any residual non-Y-axis polarization from ray R25 before ray R25 reaches viewers eye 46. The clean-up polarizer will also absorb any light from the environment that would otherwise be reflected by the reflective polarizer 70. The clean-up linear polarizer may be a polarizer film that is thermoformed onto reflective polarizer 70 and attached using adhesive or may be located elsewhere between the reflective polarizer 70 and eye 46.

The portion of ray R9 that is transmitted by partially reflective mirror 62 is shown by ray R10. Ray R10 is converted from circularly polarized light to linearly polarized light R11 by quarter wave plate 59. Linearly polarized light R11 has a polarization aligned with the X-axis. Linear polarizer 56 (which has a pass axis aligned with the X-axis) may pass linearly polarized light R11 as ray R12. Quarter wave plate 52 may circularly polarize light R12 to produce circularly polarized light R13. Light R13 may be circularly polarized in the first direction (e.g., light R13 may be right-hand circular polarized). Light R13 may reflect off of surface S7 of display 14, as shown by ray R14. Light R14 may be circularly polarized in the second direction due to the reflection at surface S7 (e.g., reflected light R14 may be left-hand circular polarized). When circularly polarized reflected light R14 passes through quarter wave plate 52, quarter wave plate may convert the circularly polarized light into linearly polarized light R15. Because reflected light R14 has an opposite circular polarization to light R13, quarter wave plate 52 produces linearly polarized light R15 having a polarization aligned with the Y-axis of FIG. 2. Linear polarizer 56, which has a pass axis orthogonal to the linear polarization of light R15, may thereby absorb light R15. This may serve to mitigate the generation of ghost images associated with light reflected off of display 40.

Consider, for example, a scenario where quarter wave plate 52 is omitted. In this scenario, linear polarized light R12 reflects off of display 40 as linear polarized light R16 (e.g., reflected light having a polarization aligned with the polarization of light R12). Linear polarized light R16 passes through linear polarizer 56 as linear polarized light R17 and is converted into right hand circular polarized light R18 by quarter wave plate 59. A portion of light R17 is transmitted through partial mirror 62, as shown by ray R19. Quarter wave plate 66 converts circularly polarized light R19 into linear polarized light R20. The linear polarization of light R20 is aligned with the X-axis of FIG. 2 and is thereby reflected off of reflective polarizer 70, as shown by reflected light R21.

Reflected light R21 is linearly polarized and is converted into right hand circular polarized light R22 by quarter wave plate 66. A portion of right hand circular polarized light R22 is reflected off of partial mirror 62, as shown by reflected light R23. Reflected light R23 is left-hand circular polarized, due to the reflection off of partial mirror 62. Linear polarizer 66 thereby converts left-hand circular polarized light R23 into linear polarized light R24 having a polarization aligned with the pass axis of reflective polarizer 70 (i.e., aligned with the Y-axis of FIG. 2). Reflective polarizer 70 thereby passes light R24 to the user's eye 46. This light may be off-axis with respect to image light R25 and may form an undesirable ghost image G2 that is visible to the user. By forming quarter wave plate 52 between linear polarizer 56 and display 40, ghost images such as ghost image G2 may be eliminated from system 10.

Deposition techniques that may be used in forming coatings in lens 20 and on display 40 include liquid coating techniques (ink-jet printing, screen printing, pad printing, spinning, dipping, dripping, painting, and spraying), atomic layer deposition, physical vapor deposition techniques such as sputtering and evaporation, chemical vapor deposition, plasma-enhanced chemical vapor deposition, and/or other thin-film deposition techniques. The configuration of FIG. 2 (e.g., the curved concave emitting surface S7 of display 40) may help improve optical performance for device 10. As an example, curved surface S7 may help reduce field curvature across the displayed field of view so that the user is presented an image with more uniform sharpness.

The example of FIG. 2 is merely illustrative. Quarter wave plate 52, linear polarizer 56, and quarter wave plate 59 may have any other desired shapes such as curved shapes, planar shares, or other shapes (e.g., shapes matching the shape of display 40). Display 40 may have other shapes. Quarter wave plate 52 may serve to mitigate ghost images such as ghost image G2 regardless of the shape of elements 59, 56, 52, and 40 and regardless of the number and shape of lens elements in lens 20.

In practice, some of the relatively-high intensity light R7 may leak through reflective polarizer 70, forming an off-axis ghost image G1 that may be visible to the user. If desired, control circuitry 42 may adjust the images that are displayed using display 40 to compensate for potential ghost images G1, ghost images G2, and/or other ghost images associated with reflections in lens 20.

Figure 3:
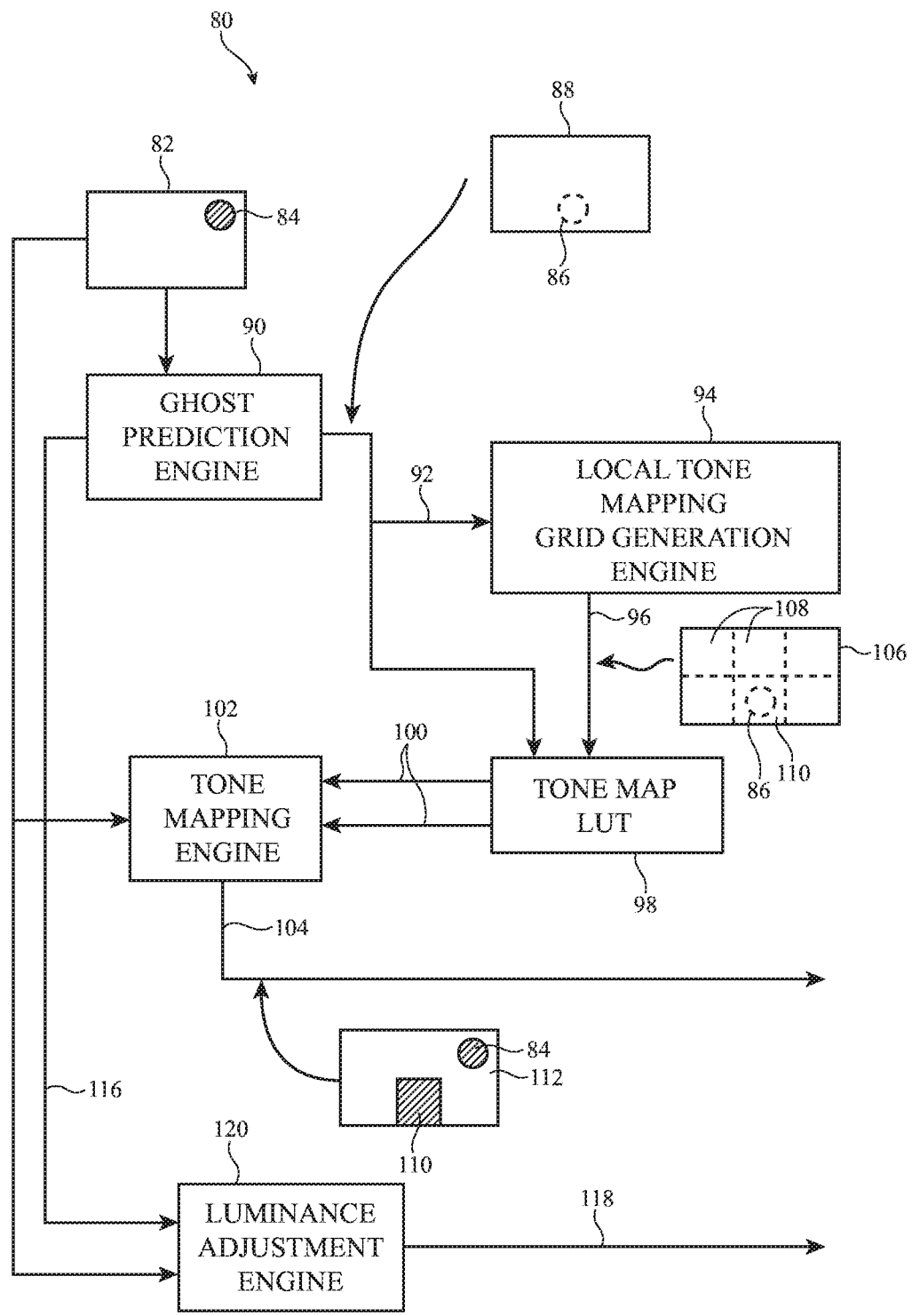
FIG. 3 is a diagram of processing circuitry for mitigating ghost images in a head-mounted device in accordance with an embodiment.

FIG. 3 is a diagram of ghost mitigation circuitry 80 in device 10 that may be used to adjust images that are displayed using display 40 for mitigating potential ghost images. Ghost mitigation circuitry 80 may, for example, be implemented using control circuitry 42 and/or other circuitry in device 10.

As shown in FIG. 3, ghost mitigation circuitry 80 may include ghost prediction circuitry such as ghost prediction engine 90, local tone mapping grid circuitry such as local tone mapping grid generation engine 94, a tone mapping look-up-table (LUT) such as tone mapping LUT 98, tone mapping circuitry such as tone mapping engine 102, and image adjustment circuitry such as luminance adjustment engine 120.

Ghost prediction engine 90 may receive an image frame such as image frame 82 (e.g., an image frame from a stream of video data to be displayed using display 40). Image frame 82 may include one or more objects such as object 84. Ghost prediction engine 90 may predict whether a given image frame 82 is likely to produce a ghost image (e.g., ghost images such as ghost images G1 and G2 of FIG. 2) based on the content of image frame 82 and the predetermined (known) geometry of catadioptric lens 20.

As an example, ghost prediction engine 90 may store calibration data (e.g., predetermined data generated during manufacture and/or testing of device 10). The calibration data may identify how ghost images are likely to be generated for certain pixel values at different locations across a given input image frame (e.g., the calibration data may be generated by measuring ghost images that appear at eye box 43 in response to different calibration image frames for the particular geometry of catadioptric lens 20). Ghost prediction engine 90 may compare input image 82 to this predetermined calibration data to predict the presence of ghost images when image frame 82 is eventually displayed using display 40. Ghost prediction engine 90 may, for example, predict the presence, location, shape, and/or intensity (strength) of ghost images in image frame 82 when displayed using display 40 based on the content of image frame 82 and the predetermined geometry of lens 20.

Ghost prediction engine 90 may convey ghost prediction information 88 to local tone mapping grid generation engine 94 over path 92. Information 88 may identify the presence, location, shape, and/or intensity of one or more ghost images such as ghost image 86 that are expected to be visible in image frame 82 when displayed using display 40. Local tone mapping grid generation engine 94 may generate a tone mapping grid 106 based on information 88. For example, engine 94 may generate a grid 106 that divides input image 82 into two or more cells 108. One or more cells 108 may overlap with the expected ghost image 86 (see, e.g., cell 110 of FIG. 3). By dividing input image frame 82 into a grid in this way, image adjustments may be performed to portions of the image frame having expected ghost image 86 without altering other portions of the image. Engine 94 may provide grid 106 to tone mapping LUT 98 over path 96. Ghost prediction engine 90 may provide information 88 to tone mapping LUT 98 over path 92.

Tone mapping LUT 98 may store a set of tone mapping curves that can be applied to input image 82 to adjust the contrast of portions (regions) of input image 82. Tone mapping LUT 98 may select a given tone mapping curve from the set of tone mapping curves based on grid 106 received from engine 98 and information 88 received from engine 90. For example, tone mapping LUT 98 may select a tone mapping curve to apply to the cell 110 of grid 106 that includes expected ghost image 86 based on the strength, size, shape, and/or position of expected ghost 86 and/or based on the content of image frame 82. The tone mapping curve may be a tone mapping curve that adjusts the contrast of cell 110 in the image frame to minimize the visibility of expected ghost 86 when image frame 82 is eventually displayed using display 40. Tone mapping LUT 98 may provide information identifying the selected tone mapping curve to tone mapping engine 102, as shown by paths 100.

Tone mapping engine 102 may apply the identified tone mapping curve to cell 110 of input image frame 82. This may serve to adjust the contrast of cell 110 in input image frame 82 (e.g., in a way such that the presence of the ghost image is minimized when image frame 82 is displayed by display 40). Tone mapping engine 102 may output adjusted image frame 112 having adjusted contrast within cell 110 over path 104. Adjusted image frame 112 may include object 84 and any other image data from image frame 82 (e.g., without contrast adjustments provided to regions other than region 110 of the image frame). Adjusted image frame 112 may be provided to additional processing circuitry to perform other image processing operations prior to being displayed or may be provided to display 40. Display 40 may display adjusted image frame 112. The adjusted contrast within region 110 may serve to minimize visibility of predicted ghost 86 within region 110 of the image frame.

If desired, tone mapping engine 102 may adjust the contrast of pixels adjacent to cell (region) 110 in image frame 112. For example, tone mapping engine 102 may mix (weight) the tone mapping curve used for region 110 with a tone mapping curve applied to pixels adjacent to region 110 (e.g., a linear tone mapping curve). In other words, engine 102 may interpolate contrast adjustments for pixels adjacent to region 110. If desired, the tone mapping curve for region 110 may be weighted more heavily for pixels closer to region 110 than for pixels farther from region 110. This may serve to blur the adjusted-contrast of region 110 with surrounding regions in the image frame (e.g., for aesthetic purposes so that the entire image frame appears as a smooth, unaltered image despite being adjusted to mitigate potential ghost images).

In practice, ghost images may be particularly visible when the background of image frame 82 is dark whereas foreground objects are bright. Such high contrast image data is relatively common in video data that is to be displayed over display 40 (e.g., during end credits for a film, during dark scenes, video game menu interfaces, etc.). If care is not taken, ghost images (e.g., faint halos or other ghost images) for this type of image data may be difficult to mitigate by adjusting local contrast (e.g., using engine 102), because bright ghost images superimposed on a black background by lens 20 cannot be removed in an additive fashion. In these scenarios, the brightness (luminance) of the entire image frame may be increased except at the location of the predicted ghost image. This may increase the luminance of the black background to match the expected luminance of the ghost image so that the ghost image blends in with the background and is no longer visible to a user.

As shown in FIG. 3, ghost mitigation circuitry 80 may include optional luminance adjustment engine 120. Luminance adjustment engine 120 may receive ghost information 88 from ghost prediction engine 90 over path 116. Luminance adjustment engine 120 may adjust the luminance (brightness) of input image frame 82 at all locations in image frame 82 except at the predicted location for the ghost image (e.g., the location of expected ghost image 86 identified by information 88). Engine 120 may output the adjusted image frame to display 40 over path 118. When display 40 displays the adjusted image, the ghost image (e.g., ghost image G1 of FIG. 2) may blend in with the increased luminance surrounding the ghost image such that it is no longer visible to the user at eye box 43. If desired, ghost prediction engine 90 may process the content of image frame 82 to determine whether to use tone mapping engine 102 or luminance adjustment engine 120 to adjust image frame 82. Both engines 102 and 120 may be used to adjust the same image frame if desired (e.g., to output an image frame having an adjusted luminance outside of the predicted ghost location and locally-adjusted contrast within and around the predicted ghost location). Circuitry 102, 94, and 98 may be omitted in another suitable arrangement if desired.

Figure 4A:
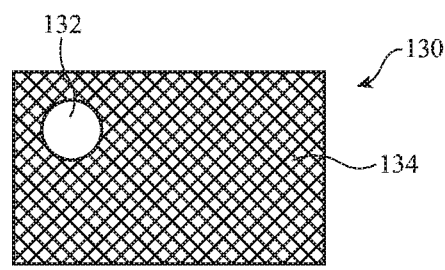
FIGS. 4A-4D are diagrams showing how luminance adjustments may be performed on an image frame to mitigate ghost images in accordance with an embodiment.

FIGS. 4A-4D are diagrams showing how luminance adjustment engine 120 may mitigate ghost images in an image frame having a bright object over a dark (e.g., black) background. FIG. 4A shows an example of an input image frame 130 (e.g., input image frame 82 of FIG. 3) having a bright object 132 over a dark background 134. The presence of bright object 132 may generate a ghost image over dark background 134 when received at eye box 43 (e.g., a faint glow or halo associated with bright object 132).

Figure 4B:
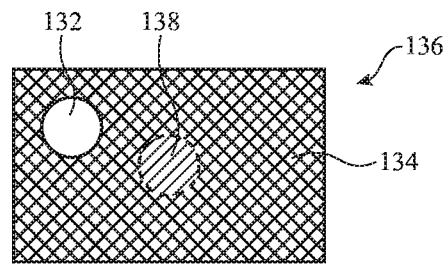

FIG. 4B shows an example of how image frame 134 may be received at eye box 43 after passing through lens 20 of FIGS. 1 and 2. As shown in FIG. 4B, object 132 produces a ghost image 138 over dark background 134. Ghost image 138 may still be present even when quarter wave plate 52 of FIGS. 1 and 2 is formed over display 40 (e.g., due to leakage of light R7 through reflective polarizer 70 as ghost image G1). Adjusting the contrast within region 138 (e.g., using local tone mapping engine 102 of FIG. 3) may be not be able to remove ghost image 138 from the frame.

Figure 4C:
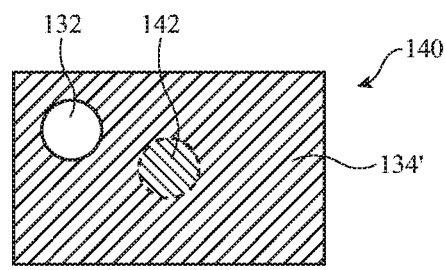

FIG. 4C shows an example of an adjusted image frame 140 that may be output by luminance adjustment engine 120 to mitigate ghost image 138. As shown in FIG. 4C, the luminance (brightness) of image frame 136 may be adjusted (increased) across the entire image frame except within region 142 overlapping expected ghost image 138. In this way, background 134 of the frame may have an increased luminance, as shown by background region 134' of FIG. 4C.

Figure 4D:
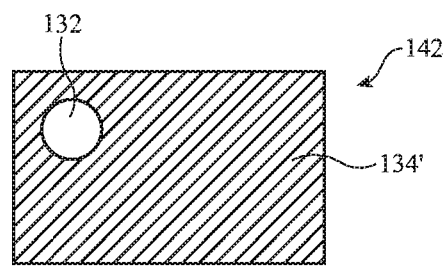

FIG. 4D shows an example of how image frame 130 of FIG. 4A would appear to a user (e.g., at eye box 43 of FIGS. 1 and 2) after being adjusted by luminance adjustment engine 120 (e.g., by displaying adjusted image frame 140 of FIG. 4C using display 40). As shown in FIG. 4D, the brightness of ghost image 138 (FIG. 4B) matches the increased luminance of background region 134' so that ghost image 138 is no longer visible in the image frame 142 when viewed at eye box 43. The example of FIGS. 4A-4D are merely illustrative. In general, any desired number of expected ghost images having any desired shapes and sizes may be mitigated in this way using luminance adjustment engine 120.

Figure 5:
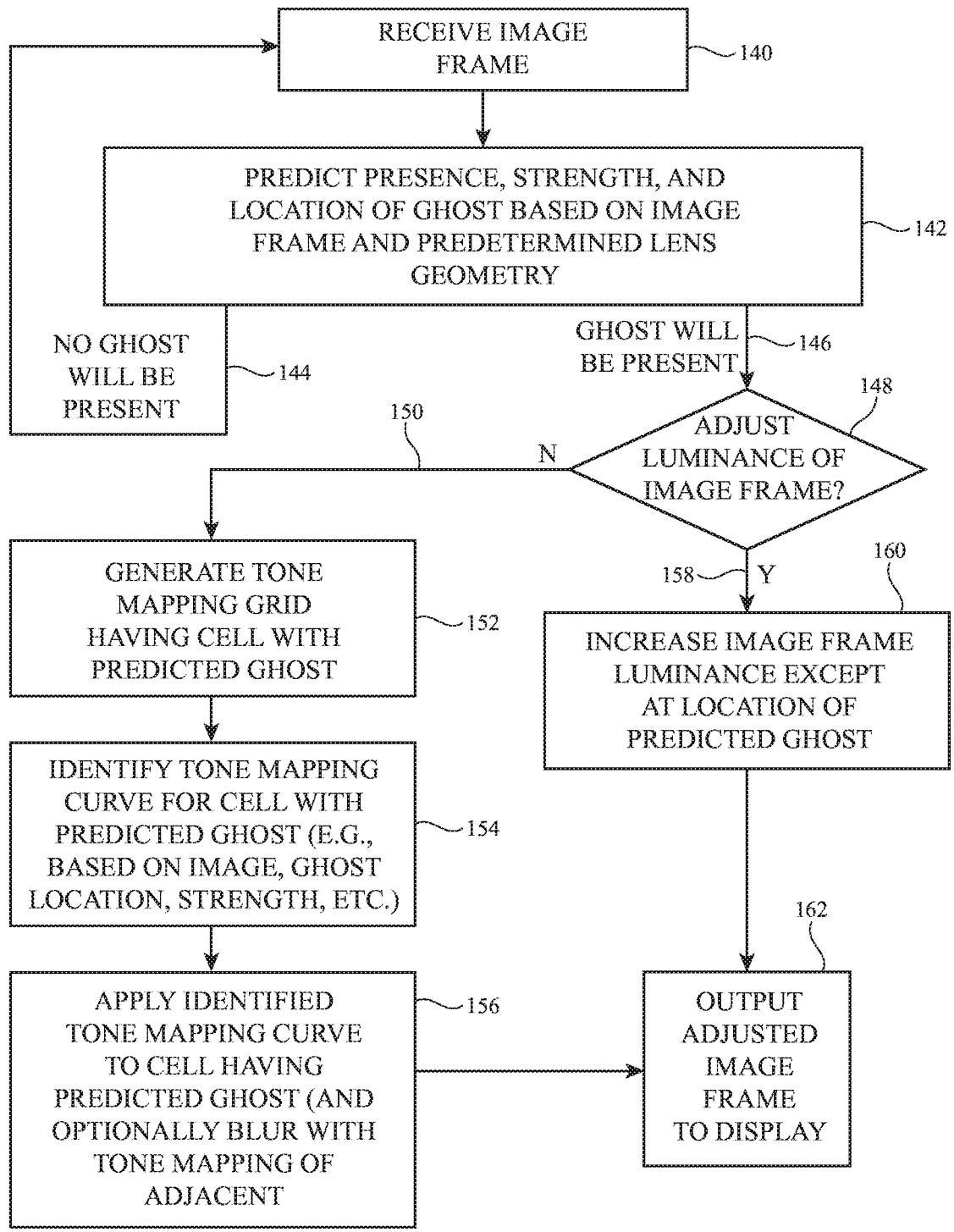
FIG. 5 is a flow chart of illustrative steps involved in mitigating ghost images in accordance an embodiment.

FIG. 5 is a flow chart of illustrative steps that may be performed by ghost mitigation circuitry 80 of FIG. 3 to mitigate potential ghost images that are visible at eye box 43. At step 140, ghost prediction engine 90 in ghost mitigation circuitry 80 may receive input image frame 82.

At step 142, ghost prediction engine 90 may predict the presence, strength, shape, size, and/or location of one or more ghost images that will be visible at eye box 43 when image frame 82 is displayed by display 40 (e.g., ghost images such as ghost image G1 of FIG. 2). Prediction engine 90 may predict this ghost image information based on the content of image frame 140 and the predetermined geometry of lens 20 (e.g., based on calibration data stored at circuitry 80). If no ghost images are predicted to be present for image frame 82, processing may loop back to step 140 as shown by path 144 to receive another image frame 82 (e.g., the next image frame in a stream of video data).

If one or more ghost images are predicted to be present for image frame 82, processing may proceed to step 148 as shown by path 146. At step 148, prediction engine 90 may determine whether the luminance of the entire image frame needs to be adjusted using engine 120 of FIG. 3. For example, prediction engine 90 may determine whether image frame 82 includes a dark background and one or more light objects over the dark background. If the luminance of the image frame needs to be adjusted (e.g., the image frame includes a relatively dark background and a relatively light foreground), processing may proceed to step 160 as shown by path 158.

At step 160, luminance adjustment engine 120 may generate an adjusted image frame (e.g., adjusted image frame 140 of FIG. 4C) by increasing the luminance of image frame 82 except at locations overlapping the predicted ghost image (e.g., except within region 142 of FIG. 4C).

At step 162, luminance adjustment engine 120 may output the adjusted image frame to display 40. Display 40 may subsequently display the adjusted image frame. By the time the adjusted image frame is received at eye box 43, the ghost image generated by lens 20 may no longer be visible to the user (e.g., as shown in FIG. 4D). If the luminance of the image frame does not need to be adjusted (e.g., the image frame does not include a relatively dark background and a relatively light foreground), processing may proceed to step 152 as shown by path 150.

At step 152, local tone mapping grid generation engine 94 may generate tone mapping grid 106 of FIG. 3. Grid 106 may include a number of cells 108. One or more cells 110 may overlap the predicted ghost location.

At step 154, tone mapping LUT 98 may identify a tone mapping curve for the cell(s) 110 in the grid overlapping the predicted ghost location. The tone mapping curve may be selected based on ghost information 88 and/or the content of image frame 82 to adjust the contrast of the image frame within cell 110 such that the ghost image will be minimized when received at eye box 43.

At step 156, tone mapping engine 102 may output adjusted image frame 112 of FIG. 3. Engine 102 may generate adjusted image frame 112 by adjusting the contrast within cell(s) 110 of the image frame using the selected tone mapping curve. If desired, pixels adjacent to cell 110 may be adjusted by weighting the selected tone mapping curve with another tone mapping curve (e.g., a linear tone mapping curve) to blur the adjusted contrast region within the image frame. Processing may subsequently proceed to step 162, at which engine 102 may output the adjusted image frame to display 40. Display 40 may display the adjusted image frame. By the time the adjusted image frame is received at eye box 43, the presence of the ghost image generated by lens 20 may be minimized (e.g., may be invisible or unperceivable the user due to the contrast adjustments performed by the tone mapping engine).

The steps of FIG. 5 are merely illustrative. Two or more of the steps of FIG. 5 may be performed concurrently. The steps of FIG. 5 may be performed in other orders if desired. Steps 148 and 160 may be omitted or steps 148, 152, 154, and 156 may be omitted. Step 160 may be performed on an image frame adjusted at steps 152-156 or steps 152-156 may be performed on an image frame adjusted at step 160 if desired.

Figure 6:
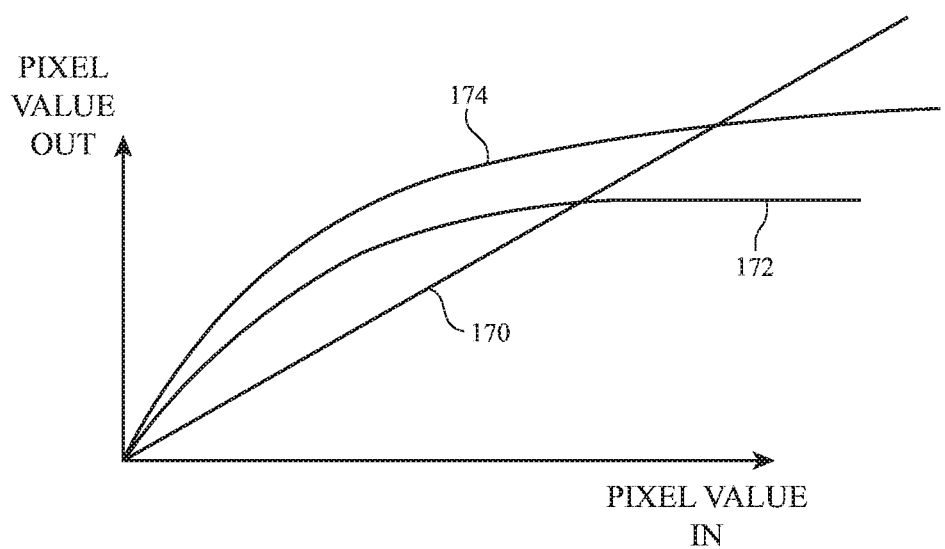
FIG. 6 is a graph showing different tone mapping curves that may be applied to an image frame to mitigate ghost images in accordance with an embodiment.

FIG. 6 is a graph of illustrative tone mapping curves that may be used in mitigating ghost images (e.g., while processing steps 152-156 of FIG. 5). As shown in FIG. 6, pixel input values are plotted on the horizontal axis and pixel output values are plotted on the vertical axis. Tone mapping LUT 98 of FIG. 3 may select a desired tone mapping curve such as curves 174, 172, 170, or other tone mapping curves to adjust the localized contrast within cell 110 of image frame 82. If no contrast adjustment is to be performed, linear tone mapping curve 170 may be selected. When curve 170 is applied to a given pixel value in an image frame, the output of the tone mapping operation will be the same given pixel value. When non-linear curves such as curves 172, 174, or other curves are applied to a given pixel value in an image frame, the output of the tone mapping operation (e.g., the adjusted pixel value in the adjusted image frame) will be given based on the vertical coordinate corresponding to that given pixel value on the horizontal axis. In this way, the contrast of the pixel values within cell 110 may be adjusted by engine 102 of FIG. 3 using a corresponding tone mapping curve.

Different tone mapping curves may adjust contrast in different ways and some tone mapping curves may mitigate different types of ghost images from different input pixel values differently. Tone mapping LUT 98 of FIG. 3 may select an optimal tone mapping curve that best mitigates (minimizes) the predicted ghost image. As different input frames are received, different tone mapping curves may be used as necessary to mitigate ghost images even as the ghost images change over time (e.g., based on the different input images that are received over time for the given lens geometry). In this way, ghost images that may not be mitigated by quarter wave plate 52 of FIGS. 1 and 2 such as ghost image G1 may be actively mitigated in device 10 regardless of the image data to be displayed.

The foregoing is merely illustrative and various modifications can be made to the described embodiments. The foregoing embodiments may be implemented individually or in any combination.

What is claimed is:

1. An electronic device comprising:
an array of pixels configured to produce light;
a linear polarizer configured to receive the light;
a first quarter wave plate configured to receive the light from the linear polarizer;
a first lens configured to transmit the light and having a first surface and an opposing second surface;
a second lens configured to transmit the light and having a third surface and an opposing fourth surface;
a partially reflective mirror between the first surface and the second lens;
a reflective polarizer, the second lens being disposed between the reflective polarizer and the first lens; and
a second quarter wave plate between the fourth surface of the second lens and the first lens.

2. The electronic device defined in claim 1, further comprising:
a third quarter wave plate located between the array of pixels and the linear polarizer.

3. The electronic device defined in claim 2, wherein the linear polarizer has a pass axis and the third quarter wave plate has a fast axis that is aligned at 45 degrees to the pass axis of the linear polarizer, and wherein the first quarter wave plate has a fast axis that is aligned at 45 degrees to the pass axis of the linear polarizer.

4. The electronic device defined in claim 3, wherein the second quarter wave plate has a fast axis that is aligned at 90 degrees to the fast axis of the first quarter wave plate.

5. The electronic device defined in claim 4, wherein the reflective polarizer has a reflection axis aligned with the pass axis of the linear polarizer.

6. The electronic device defined in claim 5, wherein the reflective polarizer has a pass axis orthogonal to the reflection axis.

7. The electronic device defined in claim 1, further comprising a third lens between the partially reflective mirror and the second quarter wave plate.

8. The electronic device defined in claim 1, further comprising:
a layer of optically transparent adhesive that attaches a third quarter wave plate to the pixel array.

9. The electronic device defined in claim 1, further comprising:
control circuitry coupled to the display, wherein the control circuitry is configured to:
receive an image frame;
identify a ghost image location based on a predetermined geometry of the first and second lenses and content of the image frame;
generate an adjusted image frame by adjusting contrast of a region of the image frame that overlaps the identified ghost image location; and
provide the adjusted image frame to the display.

10. The electronic device defined in claim 9, wherein the control circuitry comprises:
a ghost prediction engine configured to generate information identifying the ghost image location;
a local tone mapping grid generation engine configured to identify a region of the image frame overlapping the identified ghost image location;
a look-up table configured to select a tone mapping curve from a plurality of tone mapping curves based on the image frame and the information generated by the ghost prediction engine; and
a tone mapping engine configured to generate the adjusted image frame by applying the selected tone mapping curve to the identified region of the image frame.

11. The electronic device defined in claim 1, further comprising:
control circuitry coupled to the display, wherein the control circuitry is configured to:
receive an image frame;
identify a ghost image location based on a predetermined geometry of the first and second lenses and content of the image frame;
generate an adjusted image frame by adjusting luminance of the image frame except within a region that overlaps the identified ghost image location; and
provide the adjusted image frame to the display.

12. The electronic device defined in claim 1 wherein the second quarter wave plate is formed as a coating on the fourth surface of the second lens and wherein the fourth surface of the second lens is a convex surface.

13. The electronic device defined in claim 12 wherein the reflective polarizer is formed as a coating on the third surface of the second lens and wherein the third surface of the second lens is a concave surface.

14. The electronic device defined in claim 1, wherein the array of pixels has a curved surface.

15. An electronic device comprising:
an array of pixels configured to produce light;
a linear polarizer;
a first quarter wave plate, the linear polarizer being optically coupled between the first quarter wave plate and the array of pixels;
a second quarter waveplate coupled to the array of pixels;
a lens having a first surface and an opposing second surface, the first quarter wave plate being optically coupled between the lens and the linear polarizer; and
a partially reflective mirror on the lens.

16. The electronic device of claim 15, further comprising:
a reflective polarizer; and
a third quarter wave plate, wherein the reflective polarizer is laminated directly onto the third quarter wave plate and wherein the third quarter wave plate is located between the second surface of the lens and the reflective polarizer.

17. The electronic device of claim 15, wherein the second quarter waveplate is adhered to the array of pixels.

18. The electronic device of claim 15, wherein the array of pixels comprises light-emitting diodes.

19. The electronic device of claim 15, wherein the light comprises red, green, and blue wavelengths.

20. The electronic device of claim 15, further comprising:
control circuitry coupled to the display, wherein the control circuitry is configured to:
receive an image frame;
identify a ghost image location based on a predetermined geometry of the lens elements and content of the image frame;
generate an adjusted image frame by adjusting contrast of a region of the image frame that overlaps the identified ghost image location; and
provide the adjusted image frame to the display.

21. An electronic device comprising:
an array of pixels configured to produce light;
a linear polarizer;
a first quarter wave plate that receives the light from the linear polarizer, the linear polarizer being optically coupled between the array of pixels and the first quarter wave plate;
a first lens having a first surface and an opposing second surface, the first quarter waveplate being optically coupled between the first lens and the linear polarizer;
a second lens having a third surface and an opposing fourth surface, the first lens being optically coupled between the second lens and the first quarter wave plate;
a partially reflective mirror optically coupled between the first lens and the second lens;
a reflective polarizer, the second lens being optically coupled between the reflective polarizer and the first lens; and
a second quarter wave plate optically coupled between the array of pixels and the linear polarizer, wherein the linear polarizer has a pass axis, the second quarter wave plate has a first fast axis that is oriented at first non-zero angle with respect to the pass axis, and the first quarter wave plate has a second fast axis that is oriented at a second non-zero angle with respect to the pass axis.

* * * * *